Nov. 6, 1951   F. L. KALLAM   2,573,712
THROTTLE VALVE
Filed Sept. 4, 1945   3 Sheets-Sheet 1
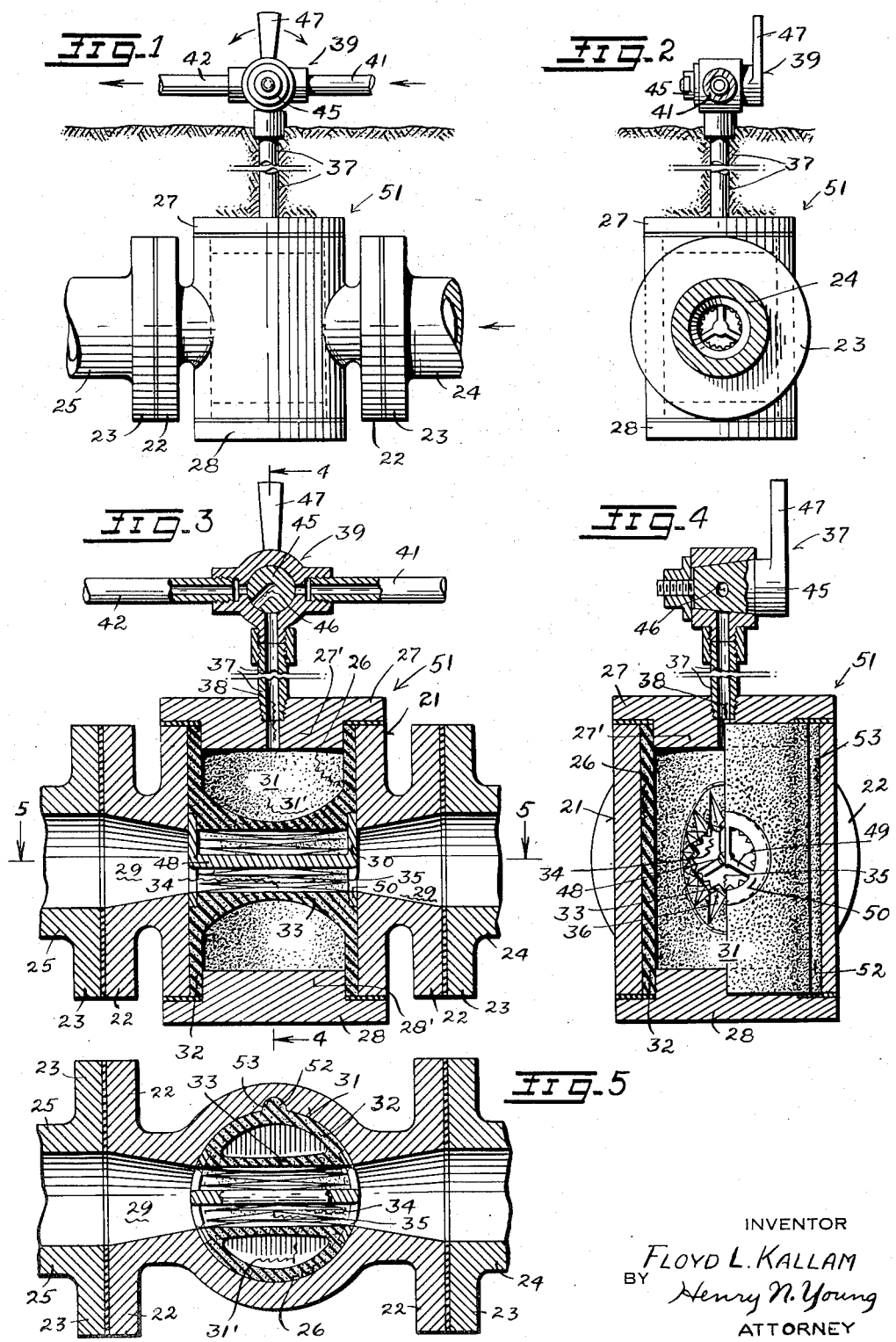
INVENTOR
FLOYD L. KALLAM
BY Henry N. Young
ATTORNEY

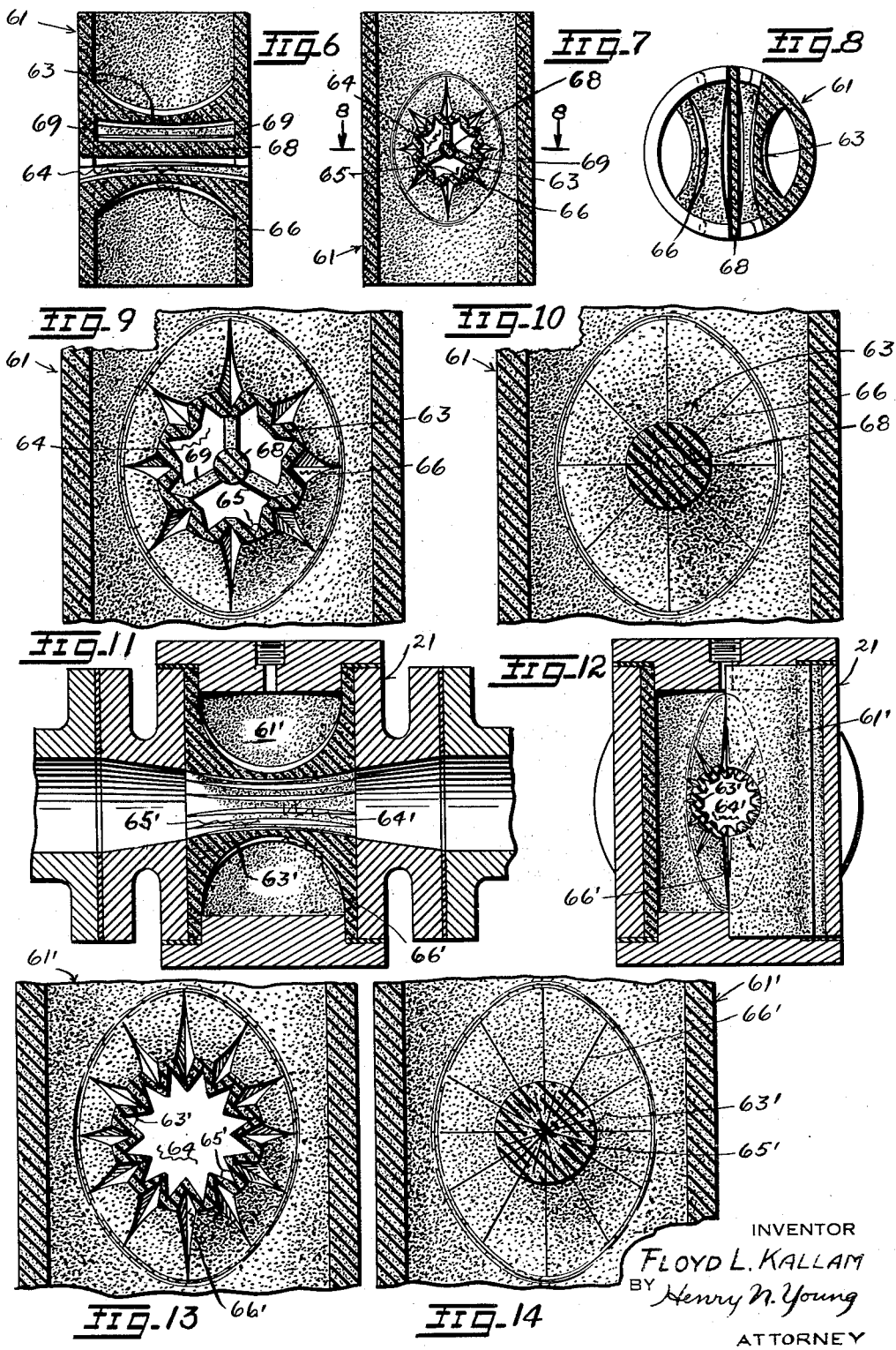

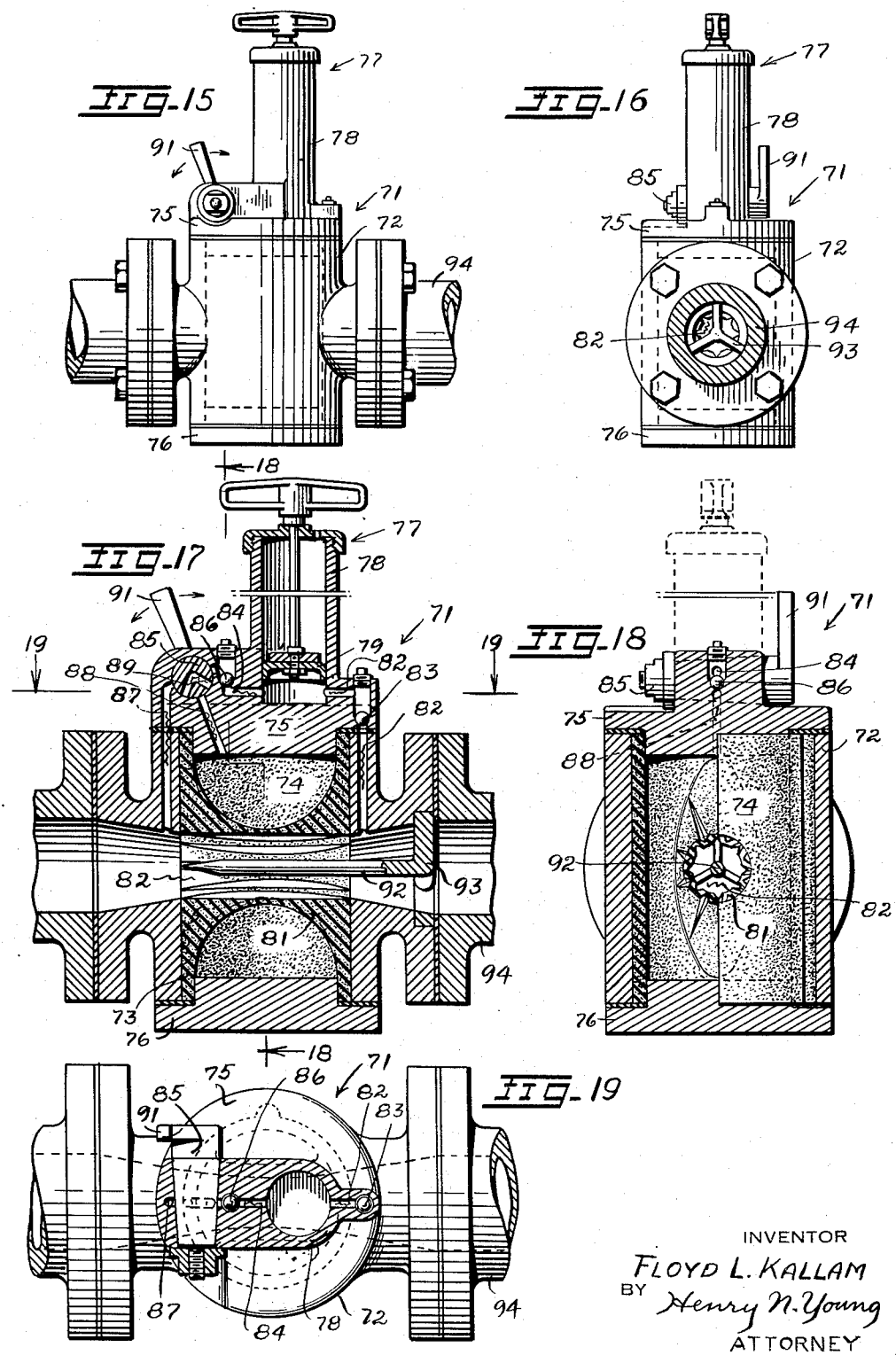

Patented Nov. 6, 1951

2,573,712

UNITED STATES PATENT OFFICE 2,573,712

THROTTLE VALVE

Floyd L. Kallam, Pasadena, Calif.

Application September 4, 1945, Serial No. 614,258

2 Claims. (Cl. 251—5)

The invention relates to a device for installation in pipe lines and other closed passages to control the flow rate there-through.

An object of the invention is to provide a throttle valve of the type described which is particularly arranged for a remote control of its operative condition.

A more specific object is to provide a valve of the character described which has a contractible throat for the control of its section by a fluid-pressure means.

A further object is to provide a valve of the type described which is usable as a shut-off valve.

The invention possesses other objects and features of value, some of which, with the foregoing, will be set forth or be apparent in the following description of typical embodiments thereof, and in the accompanying drawings, in which:

Figure 1 is a side elevation of an installation of a valve assembly embodying the invention.

Figure 2 is an end elevation of the valve assembly.

Figure 3 is an upright section taken through the longitudinal valve axis.

Figure 4 is a partially stepped section taken at the line 4—4 in Figure 3.

Figure 5 is a plan section taken at the line 5—5 in Figure 3.

Figure 6 is an upright section taken through the axis of a plug element which may be substituted for a corresponding element shown in Figures 3 to 5.

Figure 7 is an upright sectional view of the plug of Figure 6, and is taken in a plane at right angles to the view of Figure 6.

Figure 8 is a section taken at the line 8—8 in Figure 7.

Figures 9 and 10 are enlarged fragmentary sectional views through the plug members of Figures 3-5 and 6-8, and respectively show the flow passages of the plugs in open and fully closed conditions.

Figures 11 and 12 and 13 and 14 are views corresponding to Figures 3 and 4 and 9 and 10 for disclosing a modification of the plug structures of the latter figures.

Figure 15 is the side elevation of an embodiment of the valve which is provided with a manually operative device for providing fluid pressure for setting the valve.

Figures 16 and 17 and 18 respectively correspond to Figures 2 and 3 and 4 of the first embodiment for showing the embodiment of Figure 15.

Figure 19 is a sectional plan view taken at the line 19—19 in Figure 17.

Essentially, the flow control device of my invention comprises the interposition in a pipe line of a tubular member of resilient material, said member normally providing a substantially uniform full-sized flow passage therethrough, and being circumferentially compressible for decreasing its section for throttling or shutoff purposes. The device further comprises the provision immediately about the member of a chamber in which a control fluid under pressure is arranged to operate as a compressing means for effecting a controlled reduction of the flow passage of the tubular member. In practice, the tubular member is formed of a fluid-impervious and resilient rubber composition or the like, and is mounted on a suitable body or casing arranged for interposition in a pipe, the body being of rigid material.

As shown in the embodiment of Figures 1 to 5, inclusive, a body or casing 21 of relatively rigid material is provided having coaxial flanges 22 at its opposite ends for securing the body to and between end flanges 23 of aligned pipes 24 and 25, whereby the body 21 is arranged to be interposed in a pipe line of which the pipes 24 and 25 are members. The body portion between its flanges 22 is formed to provide a cylindrical space 26 having its axis perpendicular to the body axis, and caps 27 and 28 are provided for closing the space 26 at opposite ends. Coaxial flow passages 29 extend between the body ends to the space 26, said passages being particularly shown as tapering slightly from their outer ends.

A plug member 31 is provided for disposal within the body space 26, said member comprising a sleeve portion 32 fittedly engaging the side of the cylindrical space 26, and having a tubular portion 33 extending diametrically between its sides and providing a passage 34 having its ends arranged for simultaneous registration with the inner ends of the body passages 29 whereby the passages 29 and 34 jointly provide the flow passage through the body 21. Preferably, and as shown, the portion 32 of the member 31 extends to the ends of the body portion providing the space 26 receiving it, and the body caps 27 and 28 have reduced in portions 27' and 28' for sealing contact engagement within the ends of the sleeve portion 32 thereat for sealing the plug 31 in said space 26.

It will now be noted that the member 31 is formed of a fluid-impervious and resilient material such as a rubber composition or the like, and that the tubular portion 33 of the member progressively decreases in radial thickness toward its midpoint. With such a construction and relation of parts, it will be understood that the introduction of a fluid under suitable pressure into the plug space 31' between the caps 27 and 28, and surrounding the portion 33, will compress said portion and thereby effect a contraction or reduction of its passage 34 at a median portion thereof in accordance with the applied pressure, whereby to contract and even completely close the passage.

For facilitating the described throttling closing of the passage 34 by the application of fluid pressure in the closed space 26 about it, the wall of the portion 33 is preferably fluted longitudinally thereof, both internally and externally, the fluting grooves 35 and 36 respectively being mutually staggered circumferentially of the portion 33. Preferably, and as brought out in Figures 8 and 9, the grooves 35 are of V section and taper to points at the ends of the portion 33. Primary functions of the fluting of the portion 33 are to minimize the required compression of the material at the portion 33 as the passage 34 is contracted, and to permit a complete closing of the passage when sufficient pressure is applied in the plug space 31'.

Means are provided for controlling the pressure within the space 31', and thereby control the effective flow passage provided through the portion 33. As particularly shown, a pipe 37 is connected to the cap 27 at an opening 38 therethrough for use in controlling the pressure condition in the space 31' by means of a control fluid, the latter being either liquid or gaseous. The flow of control fluid to or from the space 31' is controlled through a valve 39 connected at the outer end of the pipe 37, said valve being connected with a supply pipe 41 from a source (not shown) of fluid under pressure and a relief pipe 42, whereby to control the flow of operating fluid to or from the space 31'.

As particularly illustrated, the control valve 39 comprises a body providing connections for the pipes 37 and 41 and 42 in a relation in which the connections for the pipes 41 and 42 are co-axial in a line perpendicular to the connection for the pipe 37. The body provides a cavity in which a tapered valve plug 45 is seated for rotation between different operative positions thereof, the present valve plug 45 being provided with a right-angle duct 46 for providing intake and relief connections for the pipe 37. The valve plug 45 is also intermediately settable to close off the pipe 37 thereat and thereby maintain a fixed pressure condition in the space 31'; Figure 3 shows the valve plug 45 as a set in its closed position which is intermediate between intake and relief settings therefor. A handle 47 extends from an exposed end of the plug 45 for use in rotating the plug between its different positions of use in the valve.

Having the tubular portion 33 of the member 31 in uncompressed or fully extended condition, the passage 34 may be contracted by setting the valve plug 45 for connecting the pipe 41 with the pipe 37 through the valve plug duct 46. When the flow of fluid in the controlled pipe 24—25 has been reduced or stopped as required, the valve plug 45 may be set in its closed-valve position of Figure 3 for holding the passage section at its desired size. When the passage 34 is to be reopened to its normal full size, the valve plug 45 is set for connecting the pipe 37 with the relief pipe 42. If the control fluid should be air, it may be discharged to atmosphere from the pipe 42. If the control fluid is liquid, it may be discharged into a waste pipe, or into the pipe line beyond the present control device if it should comprise liquid of the same kind as that in the controlled pipe line.

Particularly when the present control device is to function as a shut-off valve in a pipe line, it is generally desirable that the contraction of the middle part of the portion 33 of the member 31 be effected about and against a core member extending axially through the passage 34. As particularly brought out in Figures 2 to 5, a cylindrical core member 48 is held in the passage 34 in co-axial relation therewith by reason of its mounting on and between spiders engaged with the member 31 at the ends of the passage 34. The present spiders comprise relatively narrow spokes 49 extending radially from the ends of the member 48 to rings 50 which are countersunk in the cylindrical exterior of the member 31 in flush relation therewith. By having the core assembly 48—49—50 positioned entirely within the cylinder of the member 31, the latter member may be removed and replaced simply by removing the cap 27 or the cap 28 from its normally sealed mounting on the body 21. Means are preferably provided for positively assuring a properly positioning of member 31 in the space 26; as particularly shown in Figure 5 an external longitudinal rib 52 is provided on the member 31 for engaging a complementary groove 53 provided in the bore of the casing portion 32.

It is to be noted that the present flow control unit 51 provided by the body 21 and insert or plug member 31 provides a straight connecting passage between the connected pipes 24 and 25 in contradistinction to usual control valves in which flow control passages are not straight and are not of the same cross-sectional shapes as the valve is opened or closed; thus, frictional losses in the present valve are minimized. A further advantage of the use of a fluid to control the effective size of the passage 34 lies in the fact that the pipe 37 need not be straight and may be of any required length; Figures 1 and 2 indicate the installation of a unit 51 in a pipe line well below the top of the ground, while the control valve 39 is disposed aboveground. It will be understood that the permitted flow rate when the unit 51 is conditioned for operation as a throttle valve may be ascertained by the use of a suitable flow meter device (not shown) in the pipe line beyond the unit 51, or may be known by appropriately calibrating a pressure meter (not shown) interposed in the supply pipe 41.

Figures 6 to 10 inclusive illustrate the structure and installation of a plug member 61 which may be installed in the casing 21 in lieu of the member 31. The present member 61 comprises a homogeneous element formed generally as the member 31 but having a core member 68 supported in its flow passage 64 by and between sets of "spokes" 69 integrally connecting it with the rest of the member 61 at the passage ends. The core 68 of the member 61, being laterally flexible, adjusts itself to a centered position within the contracted flow tube 63 of the member, particularly when complete shutoff is to be effected by and between the passage bore and the core, and may therefore be generally superior to the rigid core 48 of the member 31 when this flow valve is to be completely closed. The installation and functioning of the member 61 are otherwise the same as for the member 31 of the first embodiment.

By reference to the enlarged fragmentary showing of Figure 9, it will be noted that the condition of the flow tube 63 when the passage 64 thereof is fully open is brought out therein. Figure 10 shows the corresponding section when the flow tube 63 grips the core 68 for a shutoff closing of the flow passage under the influence of fluid pressure about it, it being understood that a closing of the flow passage 34 of the flow tube 33 of the member 31 is effected in the same manner. For facilitating such a control of the effective flow section of the flow tube passage 64, the interior and exterior of the flow tube are preferably provided with interior and exterior longitudinal grooves 65 and 66 corresponding in form and arrangement and function to the grooves 35 and 36 of a plug member 31.

Figures 11 to 14 show a plug member 61' as applied in the casing 21 in an arrangement lacking any core member for gripping by the flow tube 63' of the member. In the use of the member 61', it will be understood that its flow tube 63' must be compressed to the limit about its axial line for effecting a complete closure of its passage 64', a complete shutoff being assured by the provision of axial fluting V grooves 65' and 66' respectively at the inside and outside of the flow tube and having the characteristics of the grooves of the previously described plug members.

Figures 15 to 19 disclose the general features of the present invention as provided in a unit 71 comprising another embodiment. In this form of the invention, a body or casing 72 similar to the casing 21 provides a cylindrical space 73 for receiving a member 74 such as the member 61' of Figures 11 to 14. Removable cap members 75 and 76 close opposite ends of the space 73; and the cap member 75 is provided with a hand pump assembly 77 and a three-way valve for setting for delivering a change of the control liquid from the pump to the space 73, holding a controlling charge in the space 73, or relieving the pressure in the space 73 to open the flow passage of the member 74. The pump 77 comprises a cylinder 78 in which a piston 79 is manually operative in alternate intake and compression strokes for the pumping therethrough and into the space 73 of a control fluid for the flow tube portion 81 of the member 74. In the present arrangement, the fluid is taken from the controlled pipe line for a valve-action contraction of the flow tube 81, and the fluid so used is arranged to be returned to the pipe line when the flow tube is to be opened.

As particularly shown, a duct 82 leads through the casing from the flow passage of the casing 72 at the intake side of the member 74 to the seat for the cap 75, and through said cap to a point at the adjacent end of the cylinder 78, a ball-check valve 83 being provided in said duct for preventing a return flow of the control fluid through the duct. A pump discharge duct 84 extends through the cap 75 to a seat for a rotary valve plug 85 provided in the cap 75, and a ball-check valve 86 is provided in the duct 84 for preventing a return flow of fluid to the pump. A duct 87 extends from the valve seat through the cap 75 and casing 72 to a point in the flow passage of the casing beyond a member 74 therein. The discharge and inlet openings for the ducts 84 and 87 are provided at opposite sides of the valve seat, and a duct 88 extends through the cap 75 and between its inner face and the plug seat at a point of the latter between the seat ends of the ducts 84 and 87. The valve plug 85 is provided with a V-shaped duct 89 for its operation as the duct 46 of the valve plug 45, the plug position being controlled by the use of a handle lever 91 attached to an extending end of the plug.

Although the member 74 lacks a core within its flow tube 81 as a unitary part of the member, a core member 92 is disposed axially in the flow tube, and is independently supported in the casing 72. In the present structure, the duct 82 is provided in the casing portion ahead of the space 73, and the core 92 is supported in its operative position from the same end of the casing. The core 92 extends from a spider disc 93 which is countersunk in the casing end face and is held in position by having its rim portion clamped between its seat and the end of the pipe 94 to which it is connected. The core 92 may be of any suitable material, and its composition and mounting are preferably such as to permit a certain amount of centering adjustment thereof as and while it is gripped in the bore of the flow tube 81.

Having the flow tube 81 fully open, and desiring to close it about the core 92 for throttling action on a stream through the passage of the tube, the control valve plug 85 is first positioned to connect the pump 77 with the space 73, and the pump is then actuated to build up a pressure in said space and thereby close the passage to a desired degree. When the desired reduced flow through the unit 71 has been established the plug 85 is turned to its intermediate and closed position to maintain the pressure in the space 73 and so maintain the adjusted flow rate in the pipe line. When the flow rate of the controlled stream is to be increased toward or to its maximum, the plug 85 is adjusted to connect the ducts 87 and 88 until the desired stream flow rate has been established; if the new flow rate is less than the permissible maximum, the plug is rotatably adjusted to its intermediate position for closing off both the ducts 82 and 87. If the maximum stream flow is desired, the plug is left in its relief position in which it connects with passages 87 and 88. Noting that the duct 87 opens into the casing flow passage at the discharged side of the member 74, it will be understood that an aspirating effect is produced with respect to the fluid in the space 73 whereby the bore portion provided by the flow tube 81 may be even larger than that provided by the body flow bore portions which it connects From the foregoing description taken in connection with the accompanying drawings, the advantages of the construction and operation of the present device will be readily understood by those skilled in the art to which this invention appertains While I have described the features and principles of operation of an assembly which I now consider to comprise a preferred embodiment of my invention, I desire to have it understood that the showing is primarily illustrative, and that such changes may be made, when desired, as fall within the scope of the following claims.

I claim:

1. In a flow control device, a body of relatively rigid material arranged for its interposed connection in a pipe line and providing a connecting bore and a second body bore intersecting the first bore and closed at its ends, a tubular member sealedly engaged in the second bore and extending across the first bore and providing openings at opposite sides thereof in registration with the first bore, a flow tube of resilient material connecting said openings and laterally spaced from the ends of the bore of the tubular member and providing a laterally sealed and normally full-sized bore connecting said openings and means for connecting the space within the tubular member with a source of fluid under pressure whereby the introduction of the fluid into the space is arranged to effect a reduction in the cross-section of the passage portion provided in the flow tube portion of the member.

2. In a flow control device, a body of relatively rigid material arranged for its interposed connection in a pipe line and providing a connecting bore and a second body bore intersecting the first bore and closed at its ends, a tubular element of resilient material removably and sealedly engaging in the second bore and extending across the first bore and providing openings at opposite sides thereof in registration with the first bore, a flow tube of resilient material integral with the tubular element and connecting said openings and laterally spaced from the ends of the bore of the tubular member and providing a laterally sealed and normally full-sized bore, and means connecting the space within the tubular element with a source of fluid under pressure whereby the introduction of the fluid under pressure into the space is arranged to circumferentially compress the tubular portion of the element to effect a reduction in the cross-section of the passage provided in the flow tube portion of the element and the subsequent release of the fluid pressure in the space is arranged to permit a resumption of its normal shape by the tubular member.

FLOYD L. KALLAM.

REFERENCES CITED

The following references are of record in the file of this patent:

UNITED STATES PATENTS

| Number | Name | Date |
| --- | --- | --- |
| 994,167 | Koppitz | Jan. 6, 1911 |
| 2,026,916 | Smith | Jan. 7, 1936 |
| 2,069,261 | Monnet | Feb. 2, 1937 |
| 2,291,912 | Meyers | Aug. 4, 1942 |
| 2,313,550 | Huber | Mar. 9, 1943 |

FOREIGN PATENTS

| Number | Country | Date |
| --- | --- | --- |
| 371,681 | Italy | of 1939 |